United States Patent [19]

Titus

[11] Patent Number: 5,145,289

[45] Date of Patent: Sep. 8, 1992

[54] REDUCED J-TUBE RISER PULL FORCE

[75] Inventor: Paul E. Titus, Houston, Tex.

[73] Assignee: Shell Oil Company, Houston, Tex.

[21] Appl. No.: 697,546

[22] Filed: May 9, 1991

Related U.S. Application Data

[60] Division of Ser. No. 101,042, Sep. 25, 1987, Pat. No. 5,035,922, which is a continuation-in-part of Ser. No. 876,152, Jun. 19, 1986, abandoned, which is a continuation-in-part of Ser. No. 876,153, Jun. 19, 1986, abandoned.

[51] Int. Cl.$^5$ ............................................. F16L 1/04
[52] U.S. Cl. ................................ 405/169; 405/168.1; 72/41; 166/350; 166/367; 427/230
[58] Field of Search ............ 427/230, 235, 239, 288.2; 252/9; 405/168, 169; 72/41; 166/350, 367

[56] References Cited

U.S. PATENT DOCUMENTS

| | | | |
|---|---|---|---|
| 4,039,717 | 8/1977 | Titus | 427/239 X |
| 4,098,091 | 7/1978 | Desai et al. | 405/169 |
| 4,137,623 | 2/1979 | Taylor | 427/239 X |
| 4,523,877 | 6/1985 | Finn et al. | 405/195 |
| 4,526,813 | 7/1985 | Wa | 427/235 |
| 4,664,978 | 5/1987 | Luis et al. | 427/302 X |
| 4,755,081 | 7/1988 | Esperza | 405/168 |
| 5,035,922 | 7/1991 | Titus | 427/239 |

Primary Examiner—Michael Lusignan

[57] ABSTRACT

A method is provided for reducing the force required to move a pipe through a J-tube attached to an offshore platform by coating the pipe with hydrophilic polymer and then moving the pipe through the J-tube, or by introducing a solution of hydrophilic polymer and water into the J-tube and then moving the pipe through the J-tube.

31 Claims, 1 Drawing Sheet

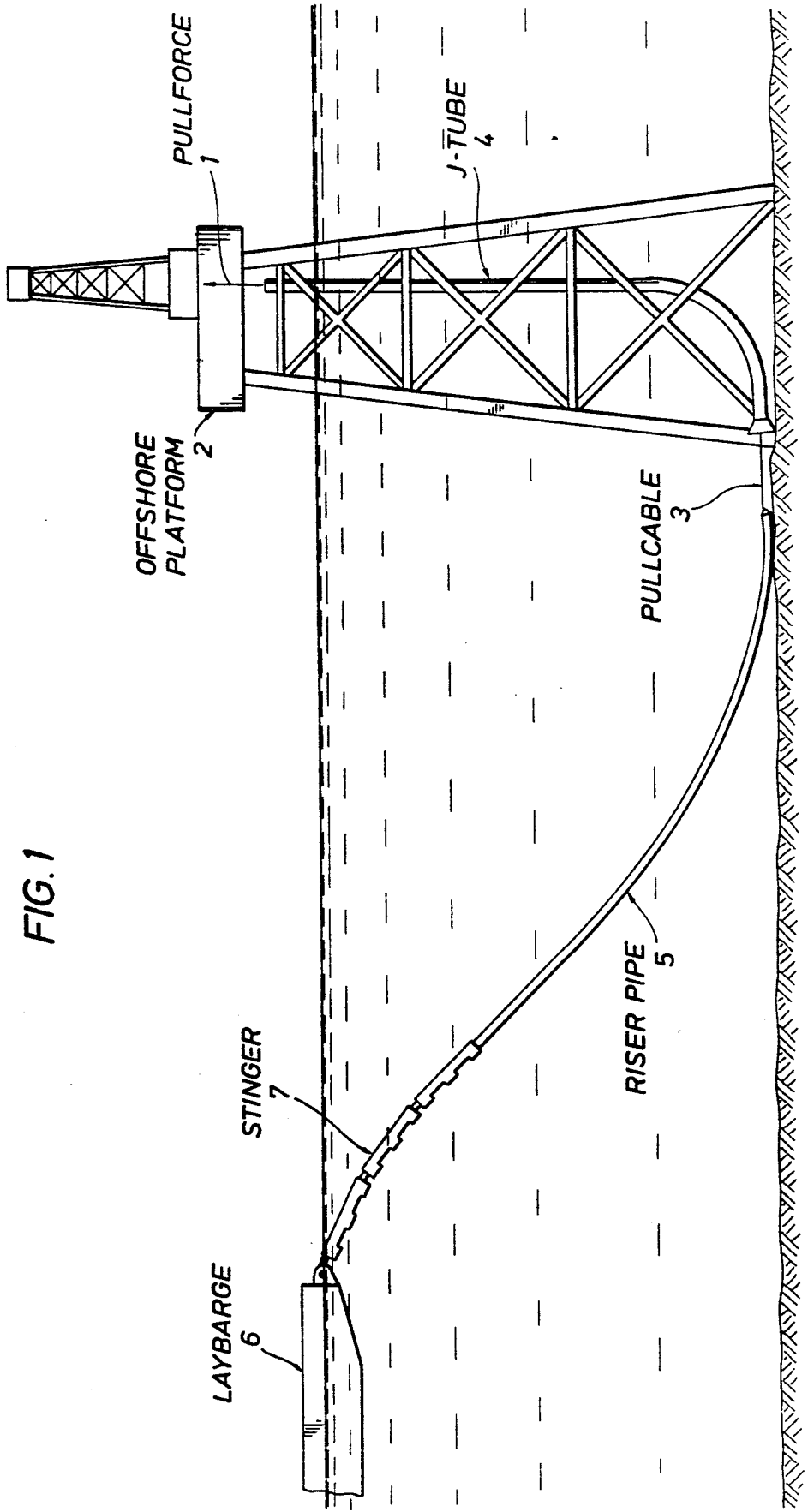

REDUCED J-TUBE RISER PULL FORCE

This is a division of application Ser. No. 07/101,042 filed Sep. 25, 1987, now U.S. Pat. No. 5,055,922, which is a continuation-in-part of application Ser. No. 06/876,152, filed Jun. 19, 1986, now abandoned, which is a continuation-in-part of application Ser. No. 06/876,153, filed Jun. 19, 1986 now abandoned.

BACKGROUND OF THE INVENTION

This invention pertains to the use of J-tubes on offshore platforms for installing pipelines extending upwardly from the seafloor.

In offshore petroleum operations, a platform frequently serves as an operational base and a production terminal for oil and gas wells. A problem common to all such offshore platforms is providing a connection from an above-water facility to a pipeline which lies on the seafloor. A typical method of providing the connection is the use of a J-tube riser guide member which is a continuous tubular structure having the shape of a J and through which a riser pipeline is pulled from the seafloor to the above-water facility. This J-tube runs down along the length of the platform, bends near the seafloor and thus runs generally parallel to the seafloor a short distance. The lower end of the J-tube frequently includes a flared portion referred to as a bell mouth. The upwardly pulled pipeline, i.e., the riser, provides a fluid flow path from the above-water facility to the pipeline on the seafloor.

At least two basic methods are known for installing the pipeline riser in the J-tube once the J-tube is positioned. In the so-called J-tube method, the riser is inserted in the seafloor end of the tube and pulled through it with a cable or other means. In the so-called reverse J-tube method, a section of the riser is inserted in the deck end of the tube and is pulled or pushed down through it as additional sections of conduit are joined to the riser at the deck. Both of these methods place stresses on the riser as it is forced through the J-tube. These stresses may cause displacement to the riser and J-tube which produce strains that exceed the limits of the materials and cause damage to the riser or J-tube.

Unfortunately, the J-tube is generally useful for riser pipeline diameters only up to about 12 inches. For riser pipelines having a diameter greater than 12 inches, the high pulling force required to install the riser is a major deterrent to further use of the J-tube. The J-tube has the advantage of a controlled and simple installation process which does not require elaborate pipeline manipulating equipment, unlike other known installation processes.

Accordingly, it is a purpose of the present invention to provide a J-tube which has all the advantages of the conventional J-tube and which can be utilized with pipeline diameters greater than 12 inches without placing undue stresses upon the pipeline or the J-tube.

Applicant is not aware of any prior art references which, in his judgment as one skilled in the pipeline art, would anticipate or render obvious the instant invention; however, for the purposes of developing the background of the invention and establishing the state of the requisite art, the following are set forth: U.S. Pat. Nos. 4,098,091, 4,523,877, 4,106,063 and 4,039,717.

SUMMARY OF THE INVENTION

The present invention provides a J-tube through which a pipeline can be moved by a reduced force. This is accomplished by providing the J-tube with a slippery coating.

Accordingly, the present invention provides a method for reducing the force required to move a pipe through a J-tube attached to an offshore platform comprising coating the pipe exterior and/or the J-tube interior with a hydrophilic polymer, or introducing a solution of a hydrophilic polymer and water into the J-tube, and then moving the pipe through the J-tube. Preferably, the hydrophilic polymer is carboxymethyl cellulose or polyacrylamide. Also preferably, the polymer is incorporated as a solid into the abraded surface of the pipe and/or J-tube, either as a part of the basic material of the abraded surface or as a coating such as a corrosion coating, e.g. hydrophilic polymer mixed with a rubber coating or as part of a liquid epoxy paint or coating. In another preferred embodiment, the polymer solution is introduced at least near the top of the J-tube or may be pumped onto the surface of the pipe as the pipe is passed into the J-tube or is introduced into the J-tube at least near the bottom of the J-tube.

The slippery coating or surface produced by the hydrophilic polymer and water or a water substitute may be neutralized or made less slippery by addition of a trivalent metal salt such as aluminum sulfate to the coating or surface.

Water substitutes such as polyols, preferably light polyols, e.g. glycerol, may be used instead of water to produce a slippery coating or surface when combined with hydrophilic polymer.

Other purposes, distinctions over the art, advantages and features of the invention will be apparent to one skilled in the art upon review of the following.

BRIEF DESCRIPTION OF THE DRAWING

FIG. 1 depicts an initiating J-tube riser method of connecting a pipeline to a fixed offshore platform.

DESCRIPTION OF PREFERRED EMBODIMENTS

Presently, a widely used way to bring an offshore pipeline up to a producing platform is to pull the pipe up through a casing attached to a leg of the platform. The casing is angled from the vertical through an arc to the horizontal on the seafloor roughly forming the letter J and thus is called the J-tube.

During the pull, extensive forces are required to overcome the resistance due to pipe deformation and pipe-to-casing friction. Depending on the final disposition of the finished pipeline, the pipe passing up through the J-tube may be coated with a corrosion-resistant coating, and because of the relatively high pull forces, an especially thick, tough, abuse-resistant coating must be used instead of the cheaper, more easily applied conventional pipeline coatings. The present invention provides a method by which the pull forces are reduced, making the process cheaper, safer, easier and thus also reducing the need for a thick, tough, abuse-resistant protective coating (when such a coating is required). This method includes the admixture or application of or the addition of solutions of relatively high molecular weight hydrophilic polymers such as carboxymethyl cellulose and polyacrylamide and the like to a corrosion coating of the pipe that is pulled and/or pushed or, in the case of solutions, added to the J-tube either before or during the pipe pull and/or push. These polymers in relatively small quantities, for example less than 10% by weight, have the characteristic of imparting a lubricity to water thus significantly reducing the friction of the pipe as it passes through the J-tube. In the case of a solution application, the polymer/water solution can be made up (0.5%w to 2%w polymer) and the J-tube filled with the material prior to the pull. Alternatively, a more concentrated solution (2%w to 10%w) or under some conditions (1%w to 10%w) may be pumped and injected onto the pipe surface just as it enters the J-tube. In the case of a coating application, the powdered polymer may be impregnated on the surface of the pipeline, e.g. into a coating, preferably prior to makeup of the pipe, such that maximum benefit is achieved during movement of the pipe through the J-tube. Also, the powdered polymer may be applied mixed with an outside elastomeric layer (e.g. vulcanized or unvulcanized rubber or rubber cement) or applied as part of a paint (e.g. epoxy liquid paint).

Where the polymer is incorporated as a solid into the abrading surfaces of the J-tube and/or riser, either as part of the basic material or as a coating, when water or water substitute is introduced into, on, or around the abrading materials, the polymer hydrates, giving a very slippery, viscid, pituitous surface. Since the polymer is within the abrading surface or surfaces :o a finite depth, it is constantly being replenished as needed. When the polymer is incorporated into the base material, powdered polymer is added to the material while the material is being fabricated. For example, the polymer may be incorporated into polyethylene, polypropylene, and other materials not requiring high temperature fabrication (e.g. <350° F.). For extreme physical abuse, the finely divided water-hydratable polymer is incorporated into the pores or grooves of a metal surface such that it is protected and released as needed. In this case, the pores may exist as surface roughness (e.g. a sand blasted surface) or as deep pores such as encountered in sintered metal or fine mesh screens or as grooves. The solid water-hydratable polymer may be further protected in the pores or grooves by being injected as part of a mixture with a thermoplastic or thermosetting polymer, such as polyethylene or epoxy, respectively.

In yet another embodiment, the finely divided water-hydratable polymer is introduced into the abrading surfaces of the J-tube and/or riser encapsulated in a water insoluble matrix (e.g. mixed into epoxy, then ground into a powder). In this case, the lubricating polymer is released only as the encapsulant is crushed or otherwise broken by the abrading surfaces. In all of the above cases, water or water substitute is needed to fully achieve lubricity. Broadly, the unique concept behind the invention is to bring a replenishing source of lubricity to the location where it is most needed.

The slippery coating or surface produced by the present invention may be neutralized or at least made less slippery by reaction with or addition to the coating or surface of a trivalent metal salt. Aluminum, chromium or iron salts such as sulfates or acetates are preferred. Most preferred are aluminum sulfate and aluminum acetate. The neutralizing step is particularly desirable, for example, where slippery coating has been spilled on the deck of a pipelay barge and it is desired to neutralize the coating or surface or make the coating or surface less slippery.

Water substitutes such as polyols may be utilized with the invention in lieu of water. Light polyols are preferred substitutes. Most preferred is glycerol. In some instances use of the water substitute may result in a more slippery coating or surface.

The invention is most useful in connection with an offshore bottom founded platform having legs which maintain an above-water facility above water level and which rests firmly on the seafloor. A J-tube, e.g. as known to the art, preferably extends upwardly from the seafloor to the above-water facility. By a pulling and/or pushing method as shown in FIG. 1, a pipe is inserted within the J-tube in a known manner to realize the benefits of the invention. A pullforce 1 applied at the topside of an offshore platform 2 to pullcable 3 passing through J-tube 4, is operative to force riser pipe 5 through the J-tube. The riser pipe, in one embodiment, is supplied from a laybarge via stinger 7.

The foregoing description of the invention is merely intended to be explanatory thereof. Various changes in the details of the described method and apparatus may be made within the scope of the appended claims without departing from the spirit of the invention.

What is claimed is:

1. A method for reducing the force required to move a pipe through a J-tube attached to an offshore platform, comprising:
   coating at least part of the contacting surfaces between the pipe and the J-tube with a hydrophilic polymer selected from the group consisting of carboxymethyl cellulose and polyacrylamide; and
   moving the pipe through the J-tube.

2. The method of claim 1 wherein the hydrophilic polymer is applied to the pipe as part of a corrosion coating.

3. The method of claim 1 wherein the hydrophilic polymer is applied to the pipe as part of a rubber coating.

4. The method of claim 1 wherein the hydrophilic polymer is applied as a coating to the pipe as a part of liquid epoxy paint.

5. The method of claim 1 wherein the hydrophilic polymer is applied to the pipe as a dry powder.

6. A method for reducing the force required to move a pipe through a J-tube attached to an offshore platform, comprising:
   introducing a solution of a hydrophilic polymer selected from the group consisting of carboxymethyl cellulose and polyacrylamide and water into the J-tube; and
   moving the pipe through the J-tube.

7. The method of claim 6 wherein the hydrophilic polymer solution is introduced at least near the top of the J-tube and water within the J-tube is displaced.

8. The method of claim 6 wherein the hydrophilic polymer solution is introduced at least near the bottom of the J-tube.

9. The method of claim 6 wherein the hydrophilic polymer solution is introduced to the J-tube as the pipe is moved through the J-tube.

10. The method of claim 6 wherein the hydrophilic polymer solution is pumped onto the surface of the pipe as the pipe is passed into the J-tube.

11. A method for reducing the force required to move a pipe through a J-tube attached to an offshore platform, comprising:

treating at least part of the contacting surface between the pipe and the J-tube to form pores or grooves;

applying a coating of a hydrophilic polymer selected from the group consisting of carboxymethyl cellulose and polyacrylamide to the contacting surfaces to fill the pores or grooves; and moving the pipe through the J-tube.

12. A method for reducing the force required to move a pipe through a J-tube attached to an offshore platform, comprising:

incorporating a hydrophilic polymer selected from the group consisting of carboxymethyl cellulose and polyacrylamide into a plastic;

covering at least part of the contacting surfaces between the pipe and the J-tube with the plastic; and moving the pipe through the J-tube, whereby abrasion of the plastic exposes the polymer to water and provides a replenishing source of lubricity.

13. A method for reducing the force required to move a pipe through a J-tube attached to an offshore platform, comprising:

encapsulating a hydrophilic polymer selected from the group consisting of carboxymethyl cellulose and polyacrylamide into a water insoluble matrix;

coating at least part of the contacting surfaces between the pipe and the J-tube with the matrix; and moving the pipe through the J-tube and crushing the matrix to expose the polymer to water at abrading surfaces between the pipe and the J-tube and provide a replenishing source of lubricity.

14. The method of claim 13 wherein the water insoluble matrix is prepared by mixing the hydrophilic polymer with epoxy and then grinding the mixture into a powder.

15. A J-tube riser comprising a pipe having an exterior coating of a hydrophilic polymer selected from the group consisting of carboxymethyl cellulose and polyacrylamide.

16. The J-tube riser of claim 14 wherein the hydrophilic polymer is part of a corrosion coating.

17. The J-tube riser of claim 14 wherein the hydrophilic polymer is part of a rubber coating.

18. The J-tube riser of claim 14 wherein the hydrophilic polymer is part of a liquid epoxy paint.

19. The J-tube riser of claim 14 wherein the hydrophilic polymer is a dry powder.

20. A J-tube riser comprising a pipe having pores on the outer surface thereof and a coating of hydrophilic polymer selected from the group consisting of carboxymethyl cellulose and polyacrylamide filling the pores or grooves.

21. A J-tube riser comprising a pipe having an exterior coating of a hydrophilic polymer selected from the group consisting of carboxymethyl cellulose and polyacrylamide encapsulated into a water insoluble matrix.

22. A J-tube riser comprising a pipe having a plastic covering with a hydrophilic polymer selected from the group consisting of carboxymethyl cellulose and polyacrylamide being incorporated into the plastic covering.

23. A J-tube useful on an offshore platform for installing a pipeline extending upwardly from the seafloor, comprising, a pipe essentially in the shape of a J and having an interior coating of a hydrophilic polymer selected from the group consisting of carboxymethyl cellulose and polyacrylamide.

24. The J-tube of claim 23 wherein the hydrophilic polymer is part of a corrosion coating.

25. The J-tube of claim 23 wherein the hydrophilic polymer is part of a rubber coating.

26. The J-tube of claim 23 wherein the hydrophilic polymer is part of a liquid epoxy paint.

27. A J-tube useful on an offshore platform for installing a pipeline extending upwardly from the seafloor, comprising, a pipe essentially in the shape of a J and having pores on the inner surface thereof, and having a coating of hydrophilic polymer selected from the group consisting of carboxymethyl cellulose and polyacrylamide filling the pores.

28. A J-tube useful on an offshore platform for installing a pipeline extending upwardly from the seafloor, comprising, a pipe essentially in the shape of a J and having a plastic liner therein with a hydrophilic polymer selected from the group consisting of carboxymethyl cellulose and polyacrylamide being incorporated into the plastic liner.

29. A J-tube useful on an offshore platform for installing a pipeline extending upwardly from the seafloor, comprising, a pipe essentially in the shape of a J and having an interior coating of a hydrophilic polymer selected from the group consisting of carboxymethyl cellulose and polyacrylamide encapsulated into a water soluble matrix.

30. A method for reducing the force required to move a pipe through a J-tube attached to an offshore platform, comprising:

providing the pipe with a slippery coating or surface comprising a hydrophilic polymer selected from the group consisting of carboxymethyl cellulose and polyacrylamide; and reducing at least part of the slipperiness of at least part of the coating or surface by addition of a trivalent metal salt to the coating or surface.

31. A method for reducing the force required to move a pipe through a J-tube attached to an offshore platform, comprising:

providing the pipe and part of an adjacent work area with a slippery coating or surface comprising a hydrophilic polymer selected from the group consisting of carboxymethyl cellulose and polyacrylamide; and reducing at least part of the slipperiness of the coating or surface on the adjacent work area by addition of a trivalent metal salt to the coating or surface on the adjacent work area.

* * * * *